United States Patent [19]

Yokoyama

[11] Patent Number: 5,053,943

[45] Date of Patent: Oct. 1, 1991

[54] CONTROL CIRCUIT FOR AUTONOMOUS COUNTERS OF A PLURALITY OF CPU'S OR THE LIKE WITH INTERMITTENT OPERATION AND RESET AFTER A PREDETERMINED COUNT

[75] Inventor: Yukio Yokoyama, Tokyo, Japan

[73] Assignee: NEC Corporation, Tokyo, Japan

[21] Appl. No.: 443,032

[22] Filed: Nov. 28, 1989

Related U.S. Application Data

[63] Continuation of Ser. No. 161,232, Feb. 17, 1988, abandoned, which is a continuation of Ser. No. 695,641, Jan. 24, 1985, abandoned.

[30] Foreign Application Priority Data

Jan. 30, 1984 [JP] Japan .................................. 59-14789

[51] Int. Cl.$^5$ .............................................. G06F 15/16
[52] U.S. Cl. .................................. 364/200; 364/280.3; 364/270.1; 364/228.3
[58] Field of Search ... 364/200 MS File, 900 MS File; 371/9.1

[56] References Cited

U.S. PATENT DOCUMENTS 3,838,261 9/1974 Rice et al.
4,210,226 7/1980 Ichioka ................................... 371/9
4,580,243 4/1986 Renner ................................. 364/900

Primary Examiner—Lawrence E. Anderson
Attorney, Agent, or Firm—Sughrue, Mion, Zinn, Macpeak & Seas

[57] ABSTRACT

In a system having plural CPUs, at least one of which is continuously operating and at least another of which is intermittently operating, autonomous counters monitor counter reset signal indicating normal operation of respective CPUs, each counter producing a CPU reset signal when it fails to receive a counter reset signal within a predetermined time period. To prevent erroneous indication of a malfunction and thus erroneous resetting of the CPUs when the intermittently operating CPU does not produce a counter reset signal within the predetermined time period while it is in its normal, non-operating state, a control circuit is provided to supply the autonomous counter monitoring the intermittently operating CPU with the counter reset signals produced by a continuously operating CPU while the intermittently operating CPU is in its non-operating state. The control circuit is advantageously used in portable mobile telephone sets and portable transmitter-receiver sets controlled by CPUs some of which are intermittently operated to save battery power.

9 Claims, 3 Drawing Sheets

CONTROL CIRCUIT FOR AUTONOMOUS COUNTERS OF A PLURALITY OF CPU'S OR THE LIKE WITH INTERMITTENT OPERATION AND RESET AFTER A PREDETERMINED COUNT

This is a Continuation of application Ser. No. 07/161.232 filed on Feb. 17, 1988, of Yukio Yokoyama entitled "CONTROL CIRCUIT FOR AUTONOMOUS COUNTERS OF A PLURALITY OF CPU'S OR THE LIKE" (now abandoned), which is a Continuation Application of application Ser. No. 06/695,641 filed on Jan. 24, 1985, both now abandoned.

BACKGROUND OF THE INVENTION

The present invention relates to an autonomous timer for automatically resetting a central processing unit (CPU) or a microprocessor unit (MPU) used in a portable mobile telephone set, a portable transmitter-receiver or the like and, more particularly, to a control circuit for autonomous timers where a plurality of CPU's or MPU's are used in such a telephone set or the like.

Recently, telephone sets, transmitter-receivers or the like have come to be equipped with a plurality of CPU's or MPU's. As will be described in detail afterwards, each of these CPU's or MPU's is provided with an autonomous counter to reset itself when the CPU or MPU is in an abnormal condition. The autonomous counter functions as a timer. If no reset pulse is supplied from the CPU or MPU within a prescribed period of time, the timer judges that the CPU or MPU has been in an abnormal condition, and supplies an automatic reset pulse. The CPU or MPU generates the reset pulse every time it executes the task of a prescribed step. In a prior art control circuit for autonomous timers, the outputs of a plurality of autonomous counters are supplied to an OR gate, whose output resets all the CPU's or MPU's.

For a portable telephone set or transmitter-receiver, keeping all the CPU's or MPU's in operation would result in a waste of battery power. Therefore, one or more are constantly kept at work, but the rest are used intermittently only when needed. In this arrangement, the prior art control circuit for autonomous timers prevents the intermittently operating CPU's or MPU's from giving reset pulses to the autonomous timers within the prescribed period of time. As a result, even though all the CPU's or MPU's are functionally normal, the whole telephone set or transmitter-receiver would be suspended from operation.

SUMMARY OF THE INVENTION

An object of the present invention, therefore, is to provide a control circuit for the autonomous counters of CPU's or MPU's including those operating intermittently.

Another object of the invention is to provide a control circuit for autonomous counters, so equipped with a switch as to be able to control the autonomous counters of the intermittently operating CPU's or MPU's.

Still another object of the invention is to provide a control circuit for autonomous counters, which operates the switch for controlling the autonomous counters of the intermittently operating CPU's or MPU's in response to the start-up of such CPU's or MPU's.

According to the present invention, there is provided a control circuit for autonomous counters comprising constantly operating first data processing means and intermittently operating second data processing means capable of transmitting data to and receiving data from each other, the first and second data processing means respectively outputting first and second reset pulses within a prescribed step of operation; first autonomous counter means coupled to the first data processing means, for producing count pulses for counting the number of first prescribed clock pulses, the first autonomous counter means being reset by the first reset pulse; second autonomous counter means coupled to the second data processing means, for producing count pulses for counting the number of second prescribed clock pulses, the second autonomous counter means being reset by a third reset pulse; first means responsive to the output of either the first or second autonomous counter means for placing the first and second data processing means in a non-operating state; and switching means coupled between the second data processing means and the second autonomous counter means, for supplying the second autonomous counter means with the second reset pulse, as the third reset pulse, when the second data processing means is in an operating state, or the first reset pulse, as the third reset pulse, when same is in a non-operating state.

BRIEF DESCRIPTION OF DRAWINGS

The foregoing and other objects, features and advantages of the present invention will become more apparent from the detailed description hereunder taken in conjunction with the accompanying drawings, wherein.

DETAILED DESCRIPTION

Figure 1:
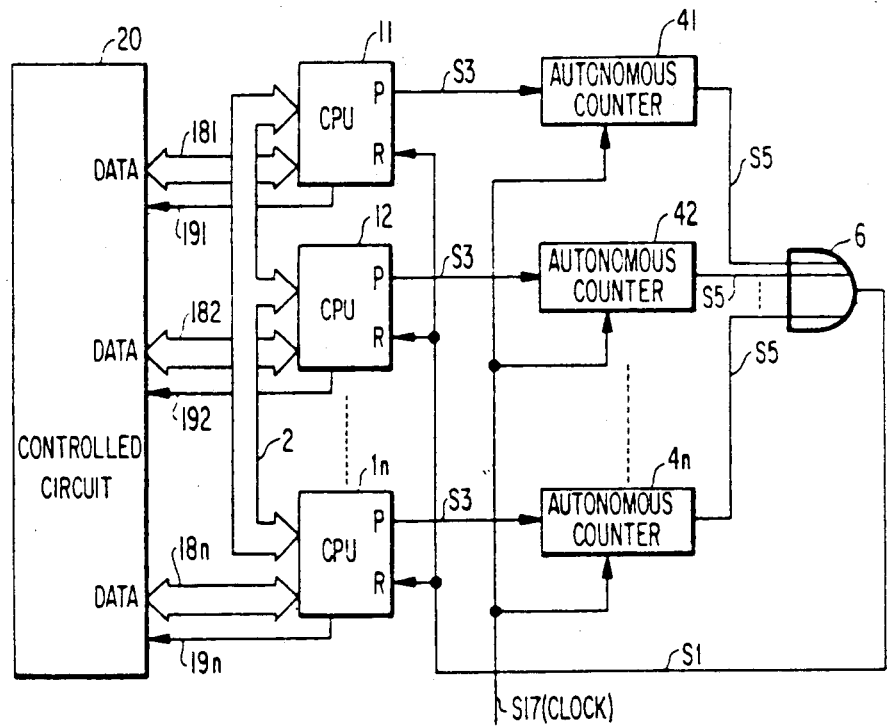
FIG. 1 is a block diagram illustrating a prior art control circuit for autonomous counters.

Referring to FIG. 1, a plurality of CPU's 11 to 1n (n is a positive integer) may be a control section of a portable transmitter-receiver or the like, and a circuit 20 to be controlled by the CPU's may be a transmitter-receiver section of the same. In a portable telephone set, the transmitter-receiver section includes radio-frequency and power amplifiers, frequency mixers, a frequency synthesizer, local frequency oscillators, band-pass filters, modulator/demodulator, and the like. The CPU's 11 to 1n may control the operation or non-operation of, designate the channel of, or transmit or receive control data to or from the transmitter-receiver section. The transmission and reception of data between the CPU's 11 to 1n and the circuit 20 are accomplished via data buses 181 to 18n, and the sending of control signals from the CPU's 11 to 1n are via control lines 191 to 19n. Data transmission between the CPU's is achieved by way of a data bus 2. The CPU's 11 to 1n are respectively connected to autonomous counters 41 to 4n at their pulse terminals P, and each CPU is so programmed as to supply autonomous reset pulses S3 autonomously, i.e., in an appropriate cycle during operation. The CPU 11 may use μPD8048 or μPD8049 and CPU 12, μPD780 all manufactured and marketed by NEC corporation.

The counters 41 to 4n, counting clock pulses S17, provide auto-reset pulses S5 when their counts surpass a prescribed number. In other words, if one of the CPU's 11 to 1n skips a step of sending a reset pulse S3 or falls into a loop or abnormal termination condition and, therefore, fails to send the reset pulse S3, the corresponding counter 41, 42, ... or 4n will output the auto-reset pulse S5. Pulse S5 is supplied by way of an OR gate 6 to the reset terminals of all the CPU's 11 to 1n, as a pulse S1, to stop them. As long as the CPU's 11 to 1n are operating normally, the reset pulse S3 is outputted before the counters 41 to 4n count up (within a period of time T), so that the CPU's 11 to 1n continue normal operation without being reset.

Some of the CPU's 11 to 1n may be operated intermittently to save battery power. In this case, as a first autonomous timer control circuit receives no reset pulse S3 from the intermittently operating CPU within the prescribed period T, all of the CPU's 11 to 1n, though they are normally operating, are reset and the whole system is suspended from operation.

Figure 2:
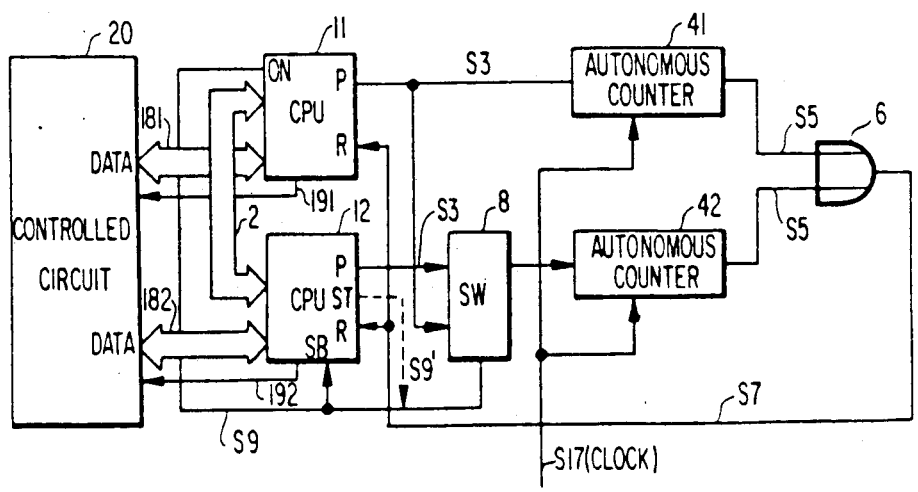
FIG. 2 is a block diagram illustrating one preferred embodiment of the control circuit for autonomous counters according to the invention.

In FIG. 2, elements to which the same reference numerals as in FIG. 1 are assigned are the same as the respectively corresponding ones in FIG. 1. In this instance of autonomous counter control, there are two CPUs, of which a first one 11 is constantly operating and a second one 12 is intermittently at work. A counter reset pulse S3 is supplied from the pulse terminal P of the first CPU 11 to an autonomous counter 41. When the counters 41 and 42 count up, they supply autonomous reset signals S5 to each of the inputs of a two-input OR gate 6. OR gate 6 sums up the signals S5 to provide a reset signal S7 to be supplied to the reset terminals R of the first CPU 11 and second CPU 12.

The input side of the counter 42 is provided with a switch circuit 8 to which the counter reset pulse S3 from the first CPU 11 and that from the second CPU 12 are supplied. A start-up signal S9 is supplied from the "ON" terminal of the first CPU 11 to the standby terminal SB of the second CPU 12 and the control terminal of the switch circuit 8. When the second CPU 12 is not operating, the counter reset pulse S3 from the first CPU 11 is, or when the second CPU 12 is operating, that from the second CPU 12 is selected for supply to the counter 42 from the switch circuit 8. The logical sum of the autonomous reset signals S5, which are the outputs of the counters 41 and 42, is provided by the two-input OR gate 6, and the resultant output, a CPU reset signal S7, simultaneously reset the first CPU 11 and second CPU 12.

The switch circuit 8 may comprise an analog switch as well as a gate circuit.

Figure 3:
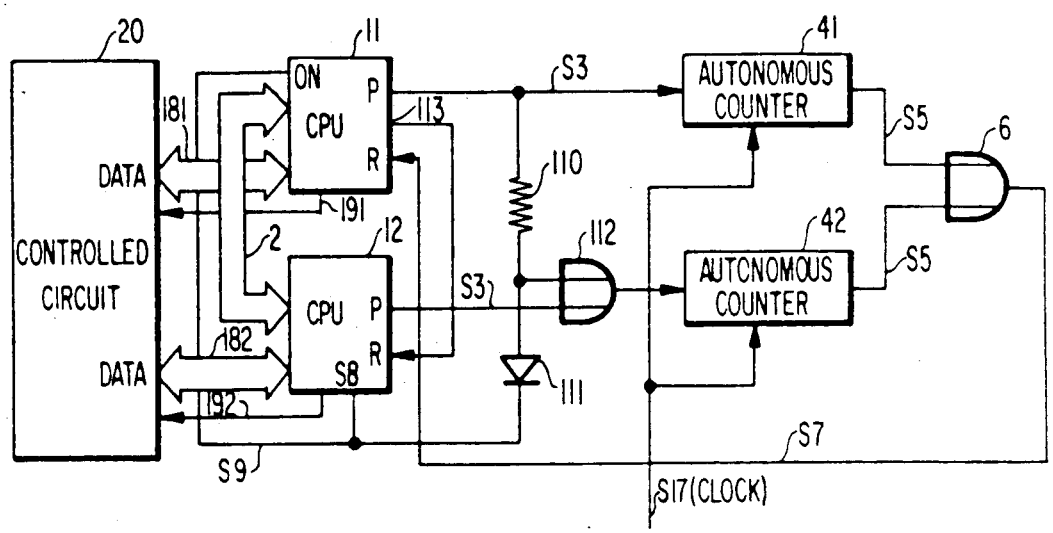
FIG. 3 is a block diagram illustrating another preferred embodiment of the control circuit for autonomous counters according to the invention.

FIG. 3 is a block diagram illustrating an autonomous timer circuit which is a second preferred embodiment of the present invention, in which an OR circuit is used as the switching section. In FIG. 3, elements identical with the corresponding ones in FIG. 2 are represented by respectively the same symbols. Herein a second CPU 12 is supposed to suspend its operation when its standby terminal SB is at a high level, and its pulse terminal P is supposed to remain at a low level while the CPU 12 is not operating. Although no counter reset pulse S3 is supplied from the second CPU 12 while this CPU 12 is not operating, a diode 111 is off because a start-up signal S9 for the second CPU 12 is at a high level, and a counter reset pulse S3 for a first CPU 11 is supplied to the counter 42 through a two-input OR gate 112. On the other hand, while the second CPU 12 is operating, the diode 111 is turned on as the start-up signal S9 drops to a low level, and the counter reset pulse S3 from the first CPU 11 ceases to be fed to the two-input OR gate 112. As a result, the counter reset pulse S3 from the second CPU 12 is supplied to the counter 42 through the two-input OR gate 112. A resistor 110 is intended for preventing the influence of the diode 111 upon the counter 41 when the diode 111 is turned on. The output of a two-input OR gate 6 is supplied only to the reset terminal R of the first CPU 11, and the reset terminal R of the second CPU 12 is connected to a reset output terminal 113 of the first CPU 11, so that, whenever the first CPU 11 is reset, a reset signal for the second CPU 12 is supplied from the reset output terminal 113 by the program of the CPU 11. As hitherto described, this embodiment operates in the same manner as that illustrated in FIG. 2.

Although the switching of the switching section in the above described embodiment is accomplished with the start-up signal S9 for the second CPU 12, the same effect can as well be achieved by separately providing a terminal for feeding a switching signal to the second CPU 12. Thus, as indicated by a broken line in FIG. 2, it is so structured that, the second CPU 12 being provided with a switching signal output terminal ST, when the second CPU 12 is operated by the program, a switching signal S9' is supplied from the switching signal output terminal ST to a switch circuit 8 instead of supplying the signal S9 directly to the switch circuit 8, and the counter reset pulse S3 outputted from the second CPU 12 is selected by the switch circuit 8.

Figure 4:
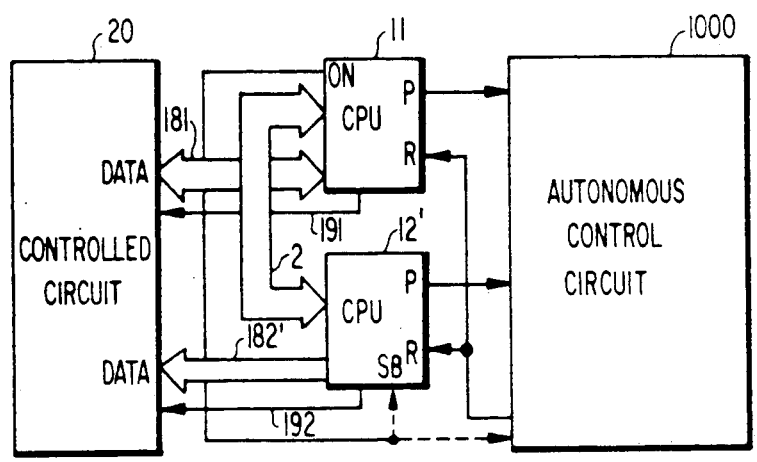
FIG. 4 is a block diagram illustrating an application of the control circuit for autonomous counters according to the invention.

FIG. 4 illustrates another form of data transmission and reception between CPU's and controlled circuits. As an autonomous control circuit 1000 in the figure is used either what was described above or what will be described below. A CPU 11 receives data from a controlled circuit 20 by way of a data bus 181, and transfer them to a CPU 12' by way of another data bus 2. The CPU 12' processes the transferred data, feeds the results of processing to the controlled circuit 20 by way of a data bus 182' and controls the circuit 20 by the use of a control line 192.

Figure 5:
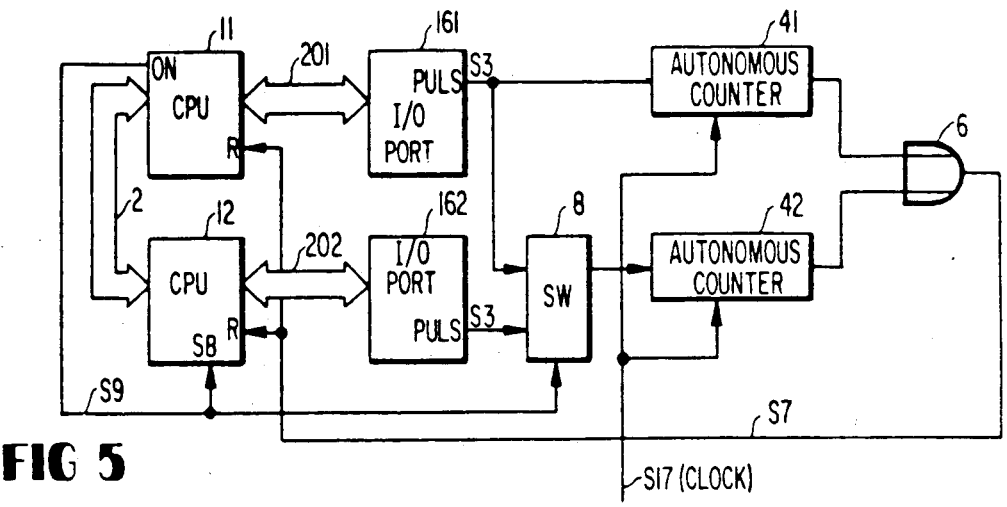
FIG. 5 is a block diagram illustrating still another preferred embodiment of the control circuit for autonomous counters according to the invention.

Referring now to FIG. 5, CPU's 11 and 12 are respectively equipped with input/output (I/O) ports 161 and 162, via which are supplied reset pulses for autonomous counters 41 and 42. This embodiment is particularly advantageous where CPUs have fewer external terminals. Interchange of data between the CPU's and I/O ports is accomplished via data buses 201 and 202. Controlled circuits are not illustrated herein with a view to simplifying the drawing. The illustration of controlled circuits is dispensed with in FIGS. 6 and 7 for the same reason.

Figure 6:
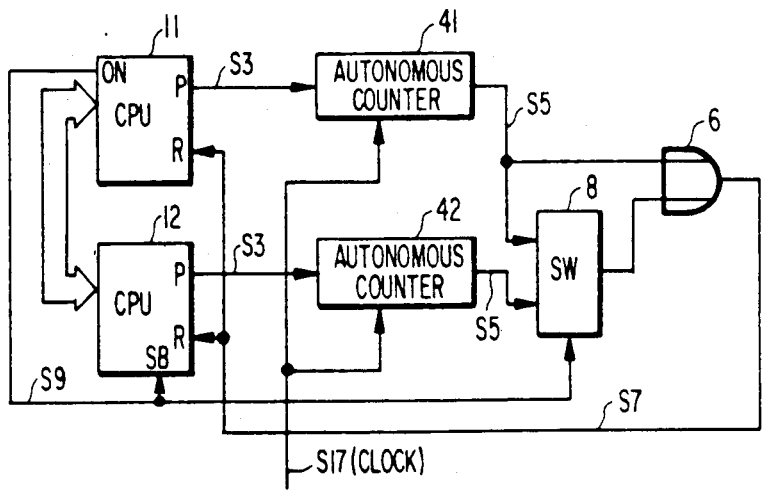
FIG. 6 is a block diagram illustrating yet another preferred embodiment of the control circuit for autonomous counters according to the invention.

The preferred embodiment illustrated in FIG. 6 has a switch circuit 8 on the output side of an autonomous counter 42. It operates in the same manner as the other embodiments described above.

Figure 7:
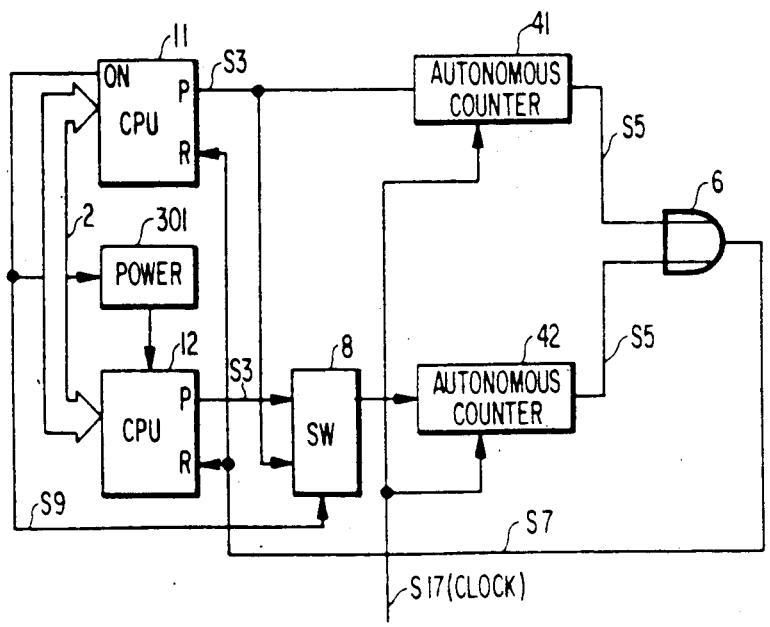
FIG. 7 is a block diagram illustrating a further preferred embodiment of the control circuit for autonomous counters according to the invention.

Referring now to FIG. 7, an intermittently operating CPU 12 is started and stopped in response to the turning on and off of an external power supply unit 301, which is turned on and off with a control signal S9 from a CPU 11. An advantage of this particular embodiment lies in that the consumption of power can be reduced to zero when the CPU 12 is not operating.

As hitherto described, an autonomous counter control circuit according to the present invention reset an autonomous counter corresponding to an inactive CPU or CPUS by the use of a counter reset pulse supplied from an active CPU and resets each CPU with the logical sum of the outputs of the autonomous counters. It is a control system having a CPU or CPUS which can be caused to intermittently operate by this arrangement and can normally reset the active CPU even when other CPU's are not operating.

What is claimed is:

1. A control circuit for autonomous counters comprising:

first data processing means operating constantly, the constant operation of said first data processing means being its normal, error-free operation;

second data processing means operating intermittently, said intermittent operation of said second data processing means being its normal, error-free operation, said first and second processing means transmitting data to and receiving data from each other and respectively outputting first and second reset pulses with execution of a prescribed step of operation;

clock pulse generating means for generating clock pulses;

first autonomous counter means coupled to said first data processing means for generating a first auto-reset pulse when it has counted a first prescribed number of clock pulses from said clock pulse generating means without being reset, said first autonomous counter means being reset by said first reset pulse;

switching means receiving said first and second reset pulses for passing said first reset pulse when said second data processing means is in a non-operating state and for passing said second reset pulse when said second data processing means is in an operating state;

second autonomous counter means coupled to said switching means for generating a second auto-reset pulse when it has counted a second prescribed number of clock pulses from said clock pulse generating means without being reset, said second autonomous counter means being reset by an output of said switching means; and first means responsive to one of said first and second auto-reset pulses for placing said first and second data processing means in a non-operating state.

2. A control circuit for autonomous counters, as claimed in claim 1, further comprising first input/output port means connected between first data processing means and said first autonomous counter means, and second input/output port means connected between said second data processing means and said switching means.

3. A control circuit for autonomous counters, as claimed in claim 1, wherein said first means comprises an OR gate whose two inputs are connected to the outputs of said first and second autonomous counter means, respectively.

4. A control circuit for autonomous counters, as claimed in claim 3, wherein said first data processing means includes means for producing a control signal, said second data processing means includes means responsive to said control signal for switching between its operating and non-operating states, and wherein said switching means comprises an OR gate, a diode receiving said first reset pulse and being controlled with said control signal, and means connecting one input of said OR gate to said diode and another input of said OR gate to receive said second reset pulse.

5. A control circuit for autonomous counters, as claimed in claim 1, further comprising means for producing a control signal indicating operation or non-operation of said second data processing means and power supply means responsive to said control signal for selectively supplying power to said second data processing means.

6. A control circuit for autonomous counters, as claimed in claim 5, wherein said first data processing means includes means for producing said control signal controlling said power supply means, said switching means also being controlled by said control signal from said first data processing means.

7. A control circuit for autonomous counters, as claimed in claim 1, wherein said prescribed numbers of the first and second clock pulses are equal to each other.

8. A control circuit for autonomous counters, as claimed in claim 7, wherein said first and second data processing means control the transmitter-receiver section of a portable radio apparatus.

9. A control circuit for autonomous counters, as claimed in claim 8, wherein the controls of said transmitter-receiver section include the turning on and off of, the channel designation for and the control data transmission to and reception from said transmitter-receiver section.

* * * * *